(12) United States Patent
Hillhouse

(10) Patent No.: US 7,240,211 B2
(45) Date of Patent: Jul. 3, 2007

(54) METHOD OF PROVIDING AN ACCESS REQUEST TO A SAME SERVER BASED ON A UNIQUE IDENTIFIER

(75) Inventor: Robert D. Hillhouse, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 777 days.

(21) Appl. No.: 09/972,156

(22) Filed: Oct. 9, 2001

(65) Prior Publication Data

US 2003/0070090 A1    Apr. 10, 2003

(51) Int. Cl.
G06F 15/16 (2006.01)
H04L 9/32 (2006.01)
G06K 19/00 (2006.01)

(52) U.S. Cl. .................... 713/182; 709/225; 709/238; 726/7

(58) Field of Classification Search ........ 709/227–229, 709/238–244, 225; 713/186, 201, 182; 707/201–203; 714/4; 726/4, 5, 7

See application file for complete search history.

(56) References Cited

U.S. PATENT DOCUMENTS 5,757,642 A * 5/1998 Jones ............................ 700/5

(Continued)

FOREIGN PATENT DOCUMENTS

EP    0 949 788 A1    10/1999

(Continued)

OTHER PUBLICATIONS

Aboba et al., "RFC 2194: Review of Roaming Implementations", Network Working Group, IETF, Internet Draft, XP002138086, Sep. 1997.

(Continued)

*Primary Examiner*—Kambiz Zand
*Assistant Examiner*—Matthew Heneghan
(74) *Attorney, Agent, or Firm*—Woodcock Washburn LLP

(57) ABSTRACT

A method in which a data access request by a user to access data of a destination server, such as the data that needs to be updated when a login and/or password is changed, is provided consistently. The destination servers are redundant, and instead of directing the access request directly to one of the redundant destination servers, an intermediate level of servers is provided that selects one of the destination servers to serve the data access request. This selection is made so that the data access request from a particular source may be directed to the same destination server. The data access request includes data that is unique to the source and/or to the user, and the selection is made in dependence on the result of a transformation, such as a hash function, performed on the unique data. Since the redundant destination servers may each identically serve the data access request, the data access request can be routed to any destination server without any change in the processing of the request.

35 Claims, 2 Drawing Sheets

U.S. PATENT DOCUMENTS

| | | | |
|---|---|---|---|
| 6,209,036 B1 | 3/2001 | Aldred et al. | 709/229 |
| 6,243,825 B1 * | 6/2001 | Gamache et al. | 714/4 |
| 6,256,737 B1 * | 7/2001 | Bianco et al. | 713/186 |
| 6,286,058 B1 * | 9/2001 | Hrastar et al. | 710/8 |
| 6,647,393 B1 * | 11/2003 | Dietterich et al. | 707/102 |
| 6,735,631 B1 * | 5/2004 | Oehrke et al. | 709/226 |
| 6,854,072 B1 * | 2/2005 | Cagle et al. | 714/15 |
| 2001/0007128 A1 | 7/2001 | Lambert et al. | 713/165 |

FOREIGN PATENT DOCUMENTS

| | | |
|---|---|---|
| EP | 949788 A1 * | 10/1999 |
| EP | 1 104 142 A1 | 11/1999 |
| WO | WO 00/69111 A2 | 11/2000 |

OTHER PUBLICATIONS

Aboba et al., "RFC 2607: Proxy Chaining and Policy Implementation in Roaming", Network Working Group, IETF, Internet Draft, XP002138087, Jun. 1999.

Calhoun et al., "DIAMETER Framework Document", IETF, Internet Draft, XP002141536, Jun. 30, 2000.

Damani et al., "ONE-IP: techniques for hosting a service on a cluster of machines", Computer Networks and ISDN Systems, North Holland Publishing, Amsterdam NL, vol. 29, No. 8-13, pp. 1019-1027, XP004095300 ISSN: 0169-7552, Sep. 1, 1997.

* cited by examiner

METHOD OF PROVIDING AN ACCESS REQUEST TO A SAME SERVER BASED ON A UNIQUE IDENTIFIER

FIELD OF THE INVENTION

This invention generally relates to user password authentication within a computer network and more specifically to the area of using LDAP servers for ensuring a user is authenticated on a server within the network even when a portion of the user login information has changed and the updated information has not had time to propagate throughout the network.

BACKGROUND OF THE INVENTION

In recent years, computer networks have grown both in size and in the number of services that a network can provide. The services provided by a computer network are accessible by end users if they have required access for the desired service. To the end user, the fact that there are multiple servers on the network is usually transparent. Login information for a user may be contained on at least one of a number of servers within the network. Typically, within most networks, user information propagates over time from one server to another to ensure that critical information is uniform throughout the network. Therefore when a user logs-in to the network it is important for the end user computer terminal to authenticate the user against the most current user information before granting access.

In a large network when a user changes some of their information, such as a login password, it is important to store this modified information somewhere within the network such that when re-authentication is required this information is readily accessible to grant the end user access. Usually within a network the passwords are stored on one of the servers within the network and typically this information is stored on a server that is in direct communication with the client terminal.

For example an end user modifies their login password, the end user password is now updated and saved on a first server in direct communication with the client terminal. The user now moves to another location within the network and logs-in on a different client terminal connected to a different second server within the network. After logging-in the second server initiates the user verification process. After the verification process the user is declined access to the network, and a message appears that the user password is invalid. The user now re-types their login information using their old password and now gains access to the network.

In this scenario the user password was initially only changed on the first server in direct communication with the client terminal; the information has not had enough time to be propagated through the network, resulting in the user being declined access by using their new password, and still having access with the old password. In order for the new user password to work on all the servers the user must wait for the updated password information to propagate through all the servers within the network before obtaining access to their account.

Of course it would be possible for the end user to utilize both passwords while logging-in to the network while the updated password propagates through the system. However using two passwords for a certain amount of time is disadvantageous and in some cases prohibitive for obtaining full network services. For instance, in a large organization there are external peripheral devices, like printers, hooked up to the servers on the network. Because of billing issues the printer requires a user ID and password before processing any print jobs. The user now wishes to print; however, their password has not yet propagated through to the printer server. Therefore, at the client terminal the new user password may work for the first server; however, when this server sends the print job to the printer server the print job will be rejected because of an invalid user password. For the end user this makes the network services inaccessible since at random the user may be prompted that their password is invalid. This dual password disadvantage means that users will change their passwords less frequently thereby possibly compromising network security.

It is therefore an object of this invention to provide a computer network which allows the user to change their personal profile (i.e. password) from any client terminal on the network, such that when the user logs-in to the network from any other client terminal their personal profile information will always be retrieved from a same server, thereby eliminating the need for having two different user passwords stored on the network.

SUMMARY OF THE INVENTION

The invention relates to a computer network and method in which a data access request by a user to access data of a destination server, such as the data that needs to be updated when a login and/or password is changed, is provided consistently. The destination servers are redundant, and instead of directing the access request directly to one of the redundant destination servers, an intermediate level of servers is provided that selects one of the destination servers to serve the data access request. This selection is made so that the data access request from a particular source may be directed to the same destination server. The data access request includes data that is unique to the source and/or to the user, and the selection is made in dependence on the result of a transformation, such as a hash function, performed on the unique data. Since the redundant destination servers may each identically serve the data access request, the data access request can be routed to any destination server without any change in the processing of the request.

In an exemplary embodiment, the invention includes a method and corresponding network for directing a data access request comprising the steps of providing a client terminal, providing a plurality of first servers, wherein at least one first server from the plurality of first servers is coupled to the client terminal, providing a plurality of redundant destination servers, each comprising means for identically serving the data access request, wherein each of the plurality of first servers is connected to each of the plurality of redundant destination servers, and providing the data access request from the client terminal to a coupled first server, the data access request including data unique to a source, where the source comprises the client terminal or a user of the client terminal. A redundant destination server is selected from the plurality of redundant destination servers by the coupled first server by transforming the data unique to the source to determine a value indicative of the selected redundant destination servers such that same data received from the client terminal results in selection of a same redundant destination server from the plurality of redundant destination servers. Data access is then provided in accordance with the data access request by the selected destination server.

BRIEF DESCRIPTION OF THE DRAWINGS

The invention will now be described with reference to the drawings in which.

DETAILED DESCRIPTION OF THE INVENTION

An ideal method of setting up a computer network that allows for maintaining user access from any client terminal within the network is by using secondary LDAP (Lightweight Directory Access Protocol) servers connected to primary servers within the network. LDAP is a directory service protocol that runs over TCP/IP with the LDAP directory structure based on entries. Each entry is a collection of attributes that has a name. For instance a password field would be considered an entry. This name is used to refer to each entry unambiguously. In LDAP servers the information within the directory entries is arranged in a hierarchical tree-like structure that reflects organizational boundaries within the network. So for instance the user login name would precede the user password in hierarchy. Within the LDAP there are operations for interrogating LDAP directories, updating LDAP directories, adding and deleting entries from a directory, changing existing entries, as well as changing the name of entries. LDAP search operation allows some portion of the directory to be searched for entries that match criteria specified by a search filter. Information can be requested from each entry matching specified criteria.

Figure 1:
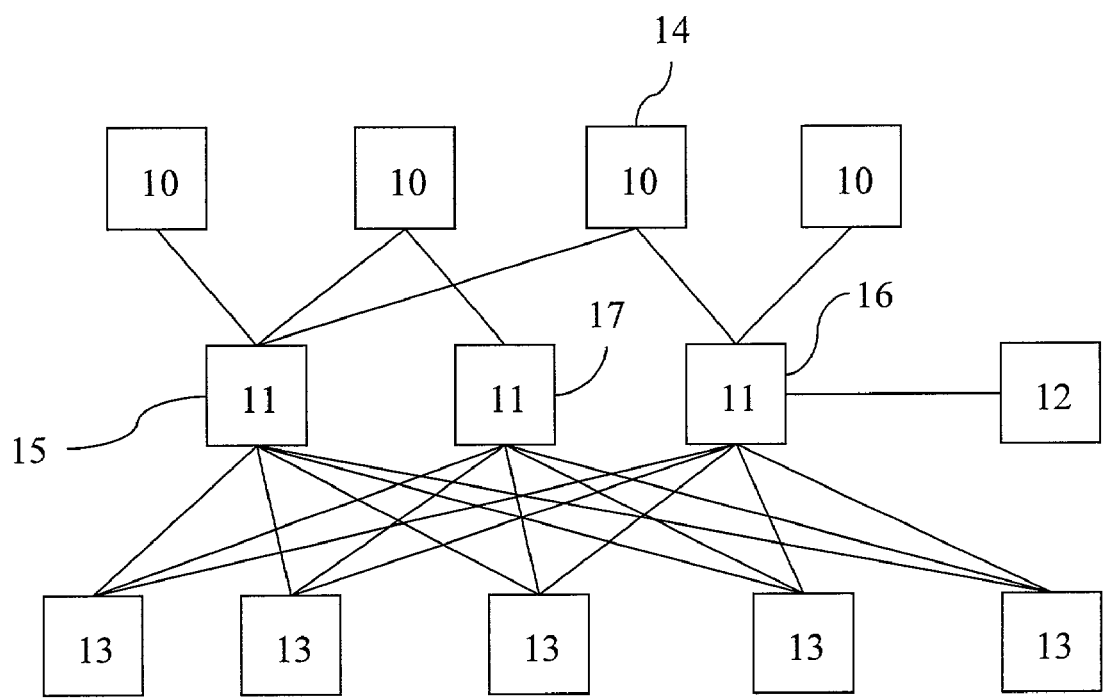
FIG. 1 is a diagram of a LDAP computer network having client terminals, servers and LDAP servers.

In FIG. 1 a LDAP computer network is illustrated. The computer network comprises client terminals 10, first servers 11, destination servers in the form of LDAP servers 13, and a network peripheral device in the form of a printer 12. The client terminals 10 are coupled via network connectivity to the first servers 11 and the first servers are coupled via network connectivity to the LDAP servers 13. Each LDAP server 13 has a network connection to each other LDAP server 13 via first servers 11 within the network. However, each client terminal is not coupled via network connectivity to each first server 11. So for instance client terminal 14 is only coupled to first servers 15 and 16, and not to 17. Therefore any information entered at client terminal 14 passes through one of the first servers 15 or 16 to get to LDAP servers 13. Each of the client terminals 10 within the network has a unique IP address associated with the client terminal.

After user information has been changed on a single LDAP server 13, it will take some time for the information to migrate through to the other LDAP servers connected to the network. Therefore it is advantageous to direct server access requests as shown in FIG. 2.

Figure 2:
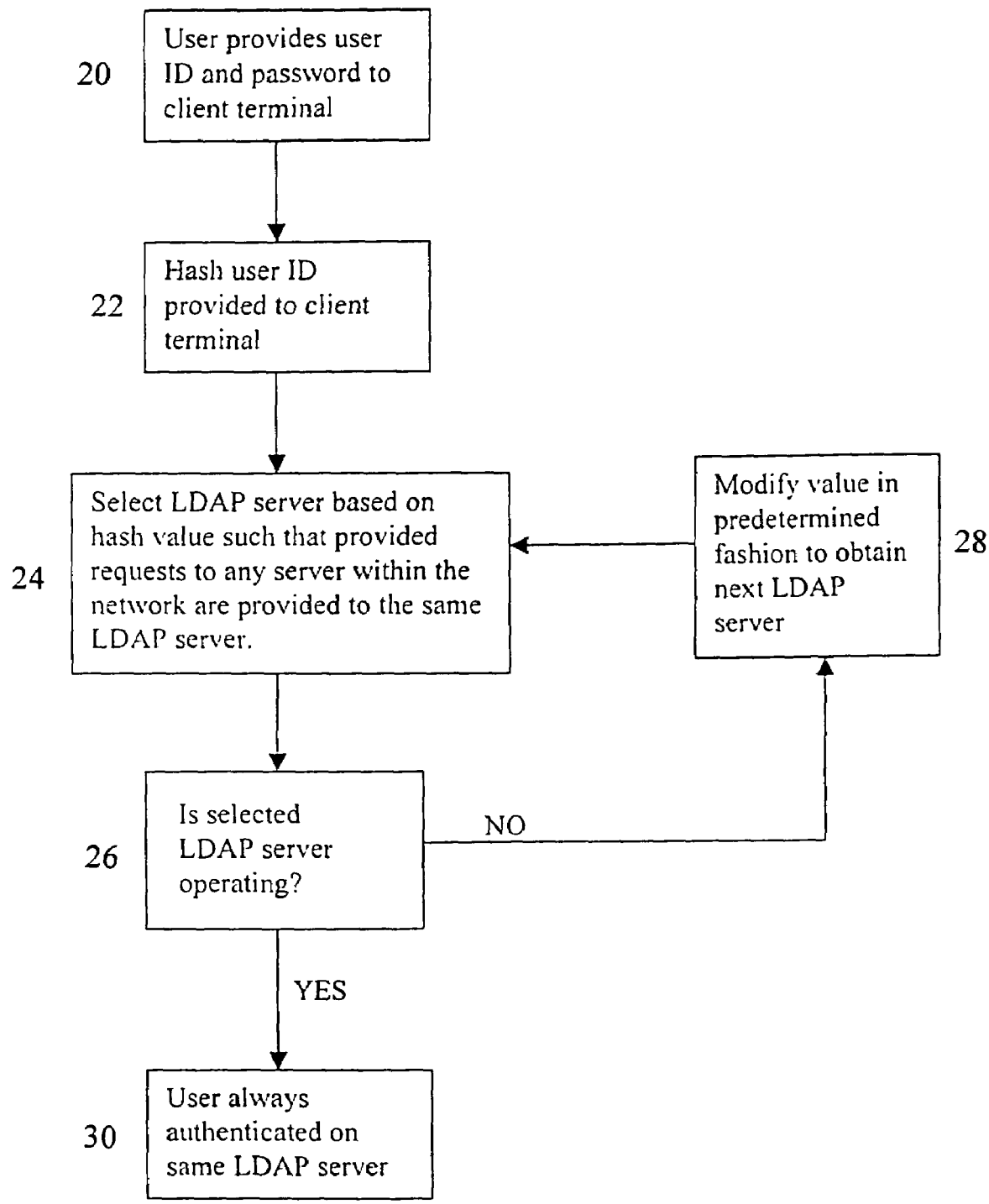
FIG. 2 is a flowchart of the user authentication process using an LDAP server.

In FIG. 2, a method of directing a server access request is shown. At the client terminal 10 a user attempts to login to the network (20). The user accesses a biometric authentication process that authenticates their biometric information and then retrieves password data from an LDAP server 13 on the network. Thus, once authenticated, a data request and an IP address of the client terminal is provided to one of the first servers 11. The first server 11 hashes the IP address, for example, provided to the client terminal (22) and uses this mathematical transform to obtain an identification or selection criteria for one of the LDAP servers 13 for processing the data access request (24). If this LDAP server happens to be inoperative or unresponsive (26), then the user access request is provided to a different LDAP server within the network based on modifying the determined identification or selection criteria in a predetermined fashion (28). Otherwise, the user is authenticated on the same LDAP serber (30).

The first server 11 connects to the determined LDAP server 13 and requests the data in accordance with the data access request. The LDAP server responds with the data, or with a pointer to the data. Typically, each LDAP server is identical to each other—exact mirrors—though there is a known time lag in data update between LDAP servers 13. A data access request presented to one LDAP server references the same entry it would at another LDAP server. Therefore whenever a piece of user information is changed on a single LDAP server it will eventually propagate to the other LDAP servers and, as such, can be accessed from any of the LDAP servers 13. Advantageously, while the information is propagating and before it has completed propagation, the user is able to enjoy full network access and full access to most current LDAP data including using new password or entry code information since access requests are directed to the same LDAP server based on an IP address.

Advantageously, with relation to user data access requests from LDAP servers 13, the first servers 11 may remain stateless, in that the first servers 11 need no prior dynamic knowledge about the network or past data access requests in order to accurately provide the advantages of the present invention. First servers 11 within the network only require network topology knowledge and knowledge of the predetermined processes used to select an LDAP server 13.

Alternatively, a step of re-hashing the IP address is performed. In an alternative embodiment a user specific data value in the form of a login name or a PIN is hashed such that a same user accesses a same LDAP server 13 each time a data request is provided for processing by the LDAP servers 13. As such, even when a user changes locations or computers, the same LDAP server is accessed by any of that user's requests.

Numerous other embodiments may be envisaged without departing from the spirit or scope of the invention.

What is claimed is:

1. A method of directing an authentication request comprising:
   providing a client terminal;
   providing a plurality of first servers, wherein at least one first server from the plurality of first servers is coupled to said client terminal;
   providing a plurality of redundant destination servers, each comprising means for identically serving said authentication request, wherein each of said plurality of first servers is connected to each of said plurality of redundant destination servers;
   providing said authentication request from said client terminal to a first server, said authentication request including authentication data unique to a user of said client terminal;
   selecting a redundant destination server from said plurality of redundant destination servers by said first server by hashing said authentication data unique to said user to determine a value indicative of the selected redundant destination servers such that the same authentication data received from said client terminal with another authentication request results in selection of a same redundant destination server from said plurality of redundant destination servers based on said value; and providing data access in accordance with said authentication request by said selected destination server.

2. A method according to claim 1 wherein said authentication data unique to said user is hashed by a hash function that hashes a PIN of said user of said client terminal to generate said value indicative of said selected redundant destination server.

3. A method according to claim 2 wherein the plurality of first servers operate for said selection of a redundant destination server independently of previous authentication requests to the destination servers.

4. A method according to claim 2 comprising:
providing biometric information;
performing a biometric authentication process for authenticating the provided biometric information; and
providing password data from redundant destination server in dependence upon the authenticated biometric information.

5. A method according to claim 3 wherein if said selected destination server is inoperative said authentication data unique to said user is hashed again to obtain a value indicating a second other selected redundant destination server.

6. A method according to claim 3 wherein if said selected destination server is inoperative said operatively connected first server according to a same predetermined process as the other first servers obtains a second other selected redundant destination server.

7. A method according to claim 6 including providing the plurality of first servers within the network with network topology knowledge.

8. A method according to claim 7 including providing the plurality of first servers within the network with instructions for carrying out a predetermined process for selecting a LDAP server.

9. A method according to claim 1 wherein said authentication data unique to said user comprises a user login identification.

10. A method according to claim 9 wherein the destination servers are LDAP servers within a network.

11. A method according to claim 10 wherein information stored on an LDAP server takes a finite time to migrate to other LDAP servers within the network.

12. A method according to claim 11 wherein said authentication request is a request for security data.

13. A method according to claim 12 wherein the security data includes access codes and wherein upon changing an access code the data stored within a single LDAP server is updated and then propagated to other LDAP servers within the network and wherein a same user retrieves the updated information upon accessing an LDAP server via any of the plurality of first servers.

14. A method according to claim 13 wherein while the changed access code and data is propagating through LDAP servers within the network the end user has full access to most current LDAP data including new password or entry code information since authentication requests are directed to the same LDAP server based on an IP address.

15. A method according to claim 12 wherein the security data includes access codes and wherein upon changing an access code the data stored within a single destination server is updated and then propagated to other destination servers within the network and wherein a same user retrieves the updated information upon accessing a redundant destination server via any of the plurality of first servers.

16. A method according to claim 1 wherein said authentication request is a request for security data.

17. A computer network for directing an authentication request comprising:
a client terminal;
a plurality of first servers, wherein at least one first server from said plurality of first servers is coupled to said client terminal; and
a plurality of redundant destination servers, each comprising means for identically serving said authentication request;
wherein each of said plurality of first servers is connected to each of said plurality of redundant destination servers, said at least one client terminal comprising means for providing said authentication request to a first server, said authentication request including authentication data unique to a user of said client terminal, the first server including selection means for selection of a redundant destination server from said plurality of redundant destination servers by hashing said authentication data unique to said user to determine a value indicative of the selected redundant destination server,
such that the same authentication data received from said client terminal with another authentication request results in selection of a same redundant destination server from said plurality of redundant destination servers based on said value,
said selected redundant destination server including means for providing data access in accordance with said authentication request.

18. A computer network according to claim 17 wherein the plurality of destination servers are LDAP servers.

19. A computer network as in claim 17, wherein the selection means includes a hash process that hashes a login name or a PIN of said user of the client terminal to determine said value.

20. A method of directing an authentication request from a client terminal through at least one of a plurality of first servers to at least one redundant destination server that is configured to identically serve the authentication request from the client terminal, comprising:
receiving an authentication request from said client terminal at a first server, said authentication request including authentication data unique to a user of said client terminal;
selecting a redundant destination server by hashing said authentication data unique to said user to a value indicative of the selected redundant destination server such that the same authentication data received from said client terminal with another authentication request results in selection of a same redundant destination server based on said value; and
providing data access in accordance with said authentication request by said selected destination server.

21. A method according to claim 20 wherein said authentication data unique to said user is hashed by a hash function that hashes a PIN of said user of said client terminal to generate said value indicative of said selected redundant destination server.

22. A method according to claim 21 wherein the plurality of first servers operate for said selection of a redundant destination server independently of previous authentication requests to the at least one redundant destination server.

23. A method according to claim 22 wherein if said selected destination server is inoperative said authentication data unique to said user is hashed again to obtain a value indicating a second other selected redundant destination server.

24. A method according to claim 22 wherein if said selected destination server is inoperative said operatively connected first server according to a same predetermined process as the other first servers obtains a second other selected redundant destination server.

25. A method according to claim 20 wherein said authentication data unique to said user comprises a user login identification.

26. A method according to claim 25 wherein the at least one redundant destination server comprises LDAP servers within a network.

27. A method according to claim 26 wherein information stored on an LDAP server takes a finite time to migrate to other LDAP servers within the network.

28. A method according to claim 27 wherein said authentication request is a request for security data.

29. A method according to claim 28 wherein the security data includes access codes and wherein upon changing an access code the data stored within a single LDAP server is updated and then propagated to other LDAP servers within the network and wherein a same user retrieves the updated information upon accessing an LDAP server via any of the plurality of first servers.

30. A method according to claim 29 wherein while the changed access code and data is propagating through LDAP servers within the network the end user has full access to most current LDAP data including new password or entry code information since authentication requests are directed to the same LDAP server based on an IP address.

31. A method according to claim 20 including providing the plurality of first servers within the network with network topology knowledge.

32. A method according to claim 31 including providing the plurality of first servers within the network with instructions for carrying out a predetermined process for selecting a redundant destination server.

33. A method according to claim 20 comprising:
receiving biometric information;
performing a biometric authentication process for authenticating the provided biometric information; and
providing password data from a redundant destination server in dependence upon the authenticated biometric information.

34. A server for directing an authentication request from a client terminal to at least one of a plurality of redundant destination servers that is configured to identically serve the authentication request from the client terminal, wherein said server is connected to each of said plurality of redundant destination servers, comprising:
means for receiving said authentication request from said client terminal, said authentication request including authentication data unique to a user of said client terminal; and
selection means for selection of a redundant destination server from said plurality of redundant destination servers by hashing said authentication data unique to said user to determine a value indicative of the selected redundant destination server such that the same authentication data received from said client terminal with another authentication request results in selection of a same redundant destination server from said plurality of redundant destination servers based on said value.

35. A server as in claim 34, wherein the selection means includes a hash process that hashes a login name or a PIN of said user of the client terminal to determine said value.

* * * * *